(12) United States Patent
Vora et al.

(10) Patent No.: US 10,235,083 B1
(45) Date of Patent: Mar. 19, 2019

(54) SYSTEMS AND METHODS FOR EFFICIENTLY MOVING DATA WITHIN A FILESYSTEM

(71) Applicant: Veritas Technologies LLC, Mountain View, CA (US)

(72) Inventors: Anurag Vora, Sunnyvale, CA (US);
Brad A Boyer, San Jose, CA (US);
Madhav Buddhi, Sunnyvale, CA (US);
Freddy James, Thrissur (IN); Ajay P Salpekar, Hayward, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 30 days.

(21) Appl. No.: 15/678,278

(22) Filed: Aug. 16, 2017

(51) Int. Cl.
*G06F 3/06* (2006.01)
*G06F 17/30* (2006.01)

(52) U.S. Cl.
CPC .......... *G06F 3/0647* (2013.01); *G06F 3/0604* (2013.01); *G06F 3/064* (2013.01); *G06F 3/065* (2013.01); *G06F 3/067* (2013.01); *G06F 3/0644* (2013.01); *G06F 17/30135* (2013.01)

(58) Field of Classification Search
CPC ...... G06F 3/064; G06F 3/0647; G06F 3/0604; G06F 3/0644; G06F 3/065; G06F 3/067; G06F 17/30135
See application file for complete search history.

(56) References Cited

U.S. PATENT DOCUMENTS

| | | | |
|---|---|---|---|
| 6,178,487 B1* | 1/2001 | Ruff | G06F 3/0607 711/112 |
| 2006/0294323 A1* | 12/2006 | Armstrong | G06F 9/45533 711/153 |
| 2007/0136721 A1* | 6/2007 | Dunshea | G06F 8/60 717/174 |
| 2009/0182970 A1* | 7/2009 | Battista | G06F 9/5077 711/173 |
| 2016/0117115 A1* | 4/2016 | Mehra | G06F 3/0631 711/112 |
| 2016/0306649 A1* | 10/2016 | Gunti | G06F 9/45558 |

* cited by examiner

*Primary Examiner* — Than Nguyen
(74) *Attorney, Agent, or Firm* — FisherBroyles LLP (57) ABSTRACT

The disclosed computer-implemented method for efficiently moving data within a filesystem may include (1) partitioning, on a storage device, physical address space of a filesystem into a plurality of logical partitions, (2) allocating, on the storage device, at least one container of data block identifiers representing data blocks for each of the logical partitions, (3) maintaining, on the storage device, a partition map of values identifying the container of data block identifiers, the logical partitions, and at least one offset associated with each of the logical partitions, (4) sending, on the storage device, the data blocks from a source logical partition within the logical partitions to a target logical partition within the logical partitions, and (5) updating, on the storage device, the partition map based on the data blocks sent from the source logical partition to the target logical partition. Various other methods, systems, and computer-readable media are also disclosed.

20 Claims, 5 Drawing Sheets

| Data Block Container | Partition ID | Offset |
|---|---|---|
| 0 | 1 | 0 |
| 1 | 0 | 0 |
| 2 | 1 | 1 |
| 3 | 2 | 1 |
| n | 2 | 0 |

130

| Data Block Container | Partition ID | Offset |
|---|---|---|
| 0 | 1 | 0 |
| 1 | 1 | 1 |
| 2 | 0 | 0 |
| 3 | 2 | 1 |
| n | 2 | 0 |

130 (Updated)

*FIG. 5*

SYSTEMS AND METHODS FOR EFFICIENTLY MOVING DATA WITHIN A FILESYSTEM

BACKGROUND

Traditional filesystem operations may include moving large amounts of data (e.g., millions of small files) from one location to another within a storage device or between storage devices. These operations often involve bulk data copying such as disk shrinking (e.g., reducing the size of a disk volume to free up additional space), disk defragmentation, etc. These operations also often involve changing filesystem metadata whenever files are moved to reflect their new locations on a storage device. However, conventional methods of moving large numbers of files in filesystems may greatly increase metadata overhead requirements, thereby resulting in time-consuming copy operations since the metadata for each file needs to be updated separately and the file copy operations themselves are only performed on a few multiples of data blocks at a time. The instant disclosure, therefore, identifies and addresses a need for improved systems and methods for efficiently moving data within a filesystem.

SUMMARY

As will be described in greater detail below, the instant disclosure describes various systems and methods for efficiently moving data within a filesystem. By utilizing logical data block identifiers to minimize the number of data blocks associated with a file in file metadata, the various systems and methods described herein may facilitate faster bulk data copy operations by increasing the speed at which large amounts of data is moved within or between data storage devices, even when there are large numbers of files to be moved.

In one embodiment, a method for efficiently moving data within a filesystem may include (1) partitioning, on a storage device, a physical address space of a filesystem into a plurality of logical partitions, (2) allocating, on the storage device, at least one container of data block identifiers representing data blocks for each of the logical partitions, (3) maintaining, on the storage device, a partition map of values identifying the container of data block identifiers, the logical partitions, and at least one offset associated with each of the logical partitions, (4) sending, on the storage device, the data blocks from a source logical partition within the logical partitions to a target logical partition within the logical partitions, and (5) updating, on the storage device, the partition map based on the data blocks sent from the source logical partition to the target logical partition.

In some examples, the container of data block identifiers may correspond to a virtual device created in each of the logical partitions. Additionally, or alternatively, the container of data block identifiers may include a set of contiguous logical block numbers.

In some examples, sending the data blocks from the source logical partition to the target logical partition may include performing a bulk copy operation of the data blocks from the source logical partition to the target logical partition.

In some examples, the data blocks may be sent from the source logical partition to the target logical partition during a shrink operation associated with the storage device. Additionally, or alternatively, the data blocks may be sent from the source logical partition to the target logical partition during a storage device defragmentation operation.

In some examples, updating the partition map based on the data blocks sent from the source logical partition to the target logical partition may include updating the values identifying the container of data block identifiers, the logical partitions, and the offset associated with each of the logical partitions.

In one example, a system for efficiently moving data within a filesystem may include several modules stored in memory, including (1) a partitioning module, stored in memory, that partitions, on a storage device, a physical address space of a filesystem into a plurality of logical partitions, (2) an allocation module, stored in memory, that allocates, on the storage device, at least one container of data block identifiers representing data blocks for each of the logical partitions, (3) a maintaining module, stored in memory that maintains, on the storage device, a partition map of values identifying the container of data block identifiers, the logical partitions, and at least one offset associated with each of the logical partitions, (4) a sending module, stored in memory, on the storage device, that sends the data blocks from a source logical partition within the logical partitions to a target logical partition within the logical partitions, and (5) an updating module, stored in memory, on the storage device, that updates the partition map based on the data blocks sent from the source logical partition to the target logical partition.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) partition, on a storage device, a physical address space of a filesystem into a plurality of logical partitions, (2) allocate, on the storage device, at least one container of data block identifiers representing data blocks for each of the logical partitions, (3) maintain, on the storage device, a partition map of values identifying the container of data block identifiers, the logical partitions, and at least one offset associated with each of the logical partitions, (4) send, on the storage device, the data blocks from a source logical partition within the logical partitions to a target logical partition within the logical partitions, and (5) update, on the storage device, the partition map based on the data blocks sent from the source logical partition to the target logical partition.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for efficiently moving data within a filesystem. As will be explained in greater detail below, by allocating containers of data block identifiers representing large contiguous blocks of data in logical partitions, the systems and method described herein may be able to minimize metadata utilized in updating a partition map tracking the movement of data between partitions (e.g., volumes) in a filesystem. By minimizing metadata utilized in updating partition maps, data may be moved more efficiently within a filesystem (even when there are large numbers of files) and the speed at which data is copied within a filesystem is increased.

In addition, the systems and methods described herein may improve the field of large scale data operations performed online, such as disk shrink and defragmentation operations, by minimizing the impact of data movement due to efficient metadata updates. These systems and methods may also improve the functioning and/or performance of a computing device by minimizing metadata overhead associated with moving large files in a filesystem resulting in the faster copying of file data.

Figure 1:
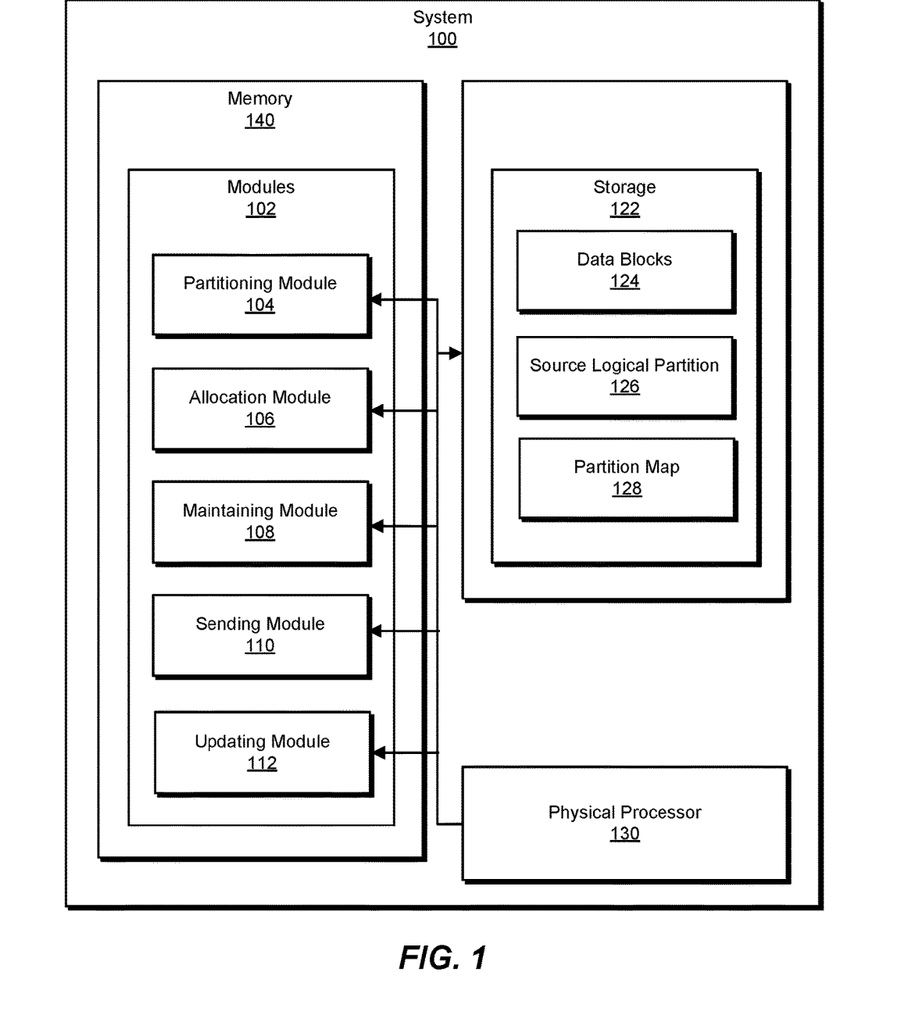
FIG. 1 is a block diagram of an example system for efficiently moving data within a filesystem.
Figure 2:
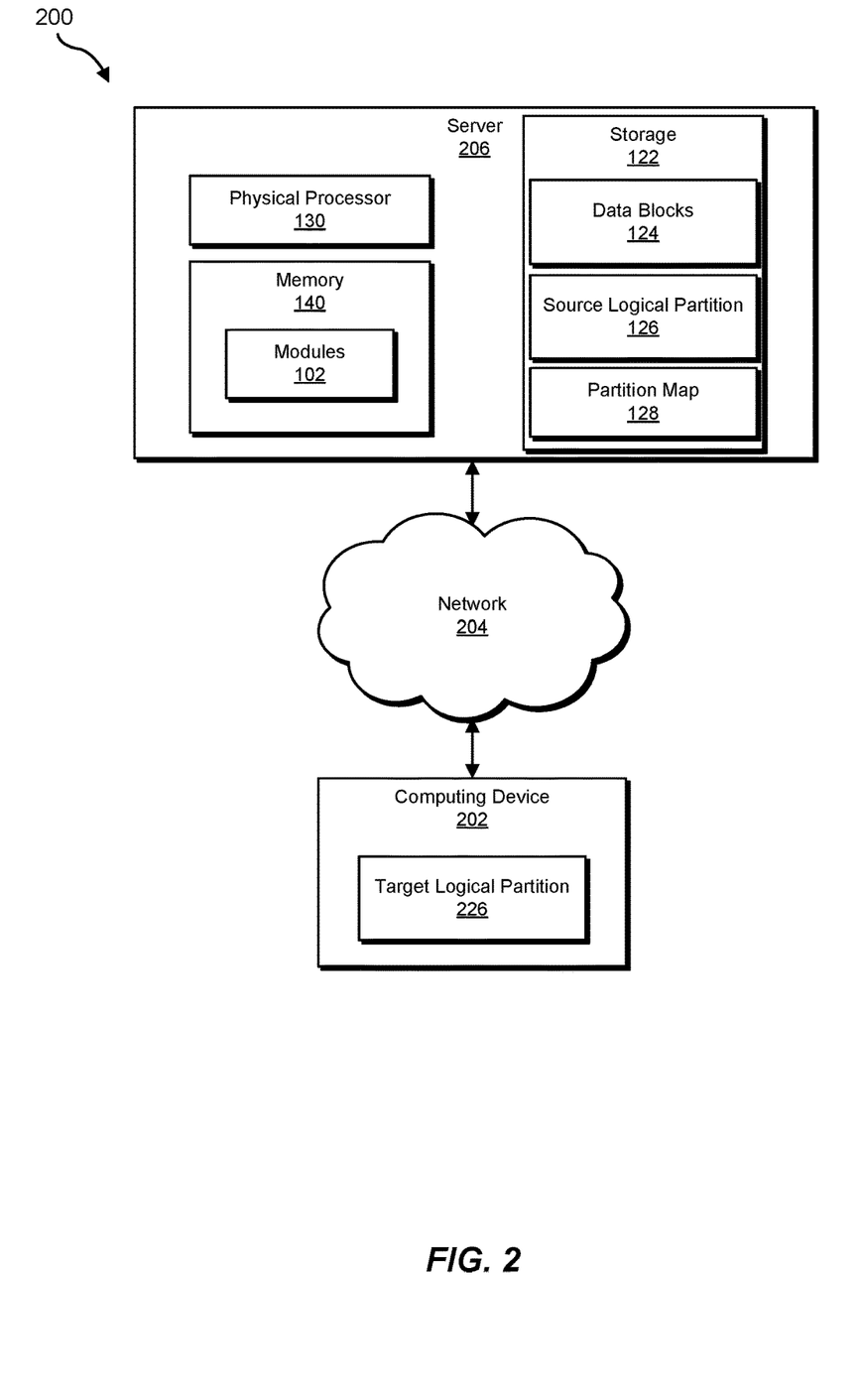
FIG. 2 is a block diagram of an additional example system for efficiently moving data within a filesystem.

The following will provide, with reference to FIGS. 1-2, detailed descriptions of example systems for efficiently moving data within a filesystem. Detailed descriptions of corresponding computer-implemented methods will also be provided in connection with FIG. 3. In addition, detailed descriptions of example source and target logical partitions as well as a partition map for efficiently moving data within a filesystem will also be provided in connection with FIGS. 4-5.

FIG. 1 is a block diagram of an example system 100 for efficiently moving data within a filesystem. As illustrated in this figure, example system 100 may include one or more modules 102 for performing one or more tasks. As will be explained in greater detail below, modules 102 may include a partitioning module 104 that partitions a physical address space of a filesystem into multiple logical partitions. Example system 100 may also include an allocation module 106 that allocates containers of data block identifiers representing data blocks 124 for each of the logical partitions. Example system 100 may also include a maintaining module 108 that maintains a partition map 128 of values identifying containers of data block identifiers, the logical partitions, and an offset associated with each of the logical partitions. Example system 100 may also include a sending module 110 that sends the data blocks from a source logical partition 126 within the logical partitions to a target logical partition within the logical partitions. Example system 100 may also include an updating module 112 that updates partition map 128 based on data blocks 124 sent from source logical partition 126 to the target logical partition. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate efficiently moving data within a filesystem. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more additional data storage devices such as storage 122. Storage 122 generally represents any type or form of data storage device capable of storing data files and associated metadata. In one example, storage 122 may include data blocks 124, source logical partition 126, and partition map 128. In some examples, data blocks 124 may include inode data blocks for a logical partition such as source logical partition 126. The term "inode," as used herein, generally refers to an on-disk data structure in a filesystem that defines everything about a file, except its name. (nodes may contain information such as user and group ownership, access mode (permissions), access time, file size, file type, and a block map for the data contents of a file. Each inode may be identified by a unique inode number in the filesystem where it resides. The inode number may be used to find an inode in an inode list for a filesystem.

Source logical partition 126 may represent allocated space on storage 122 for storing data block identifiers representing data blocks 124. In some examples, the data block identifiers may include one or more Partition Allocation Units (PAUs) which are a fixed size large set of contiguous blocks (e.g., on the order of several GBs) on the storage 122.

Partition map 128 may represent a map of values identifying a container of data block identifiers, logical partitions (such as source logical partition 126), and at least one offset associated with a logical partition. In some examples, partition map 128 may be maintained to track a mapping between logical partitions and PAUs.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to efficiently move data within a filesystem.

Computing device 202 generally represents any type or form of computing device capable of reading computer-executable instructions. In one example, computing device 202 may represent a filesystem storage server for receiving data blocks 124, moved from server 206, to store in target logical partition 226. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Server 206 generally represents any type or form of computing device that is capable of reading computer-executable instructions. In one example, server 206 may represent a filesystem storage server that is capable of moving data blocks 124 from source logical partition 126 to target logical partition 226 (on computing device 202) and further maintains and updates partition map 128. In some examples, target location 226 may alternatively reside on server 206. Additional examples of server 206 include, without limitation, other storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
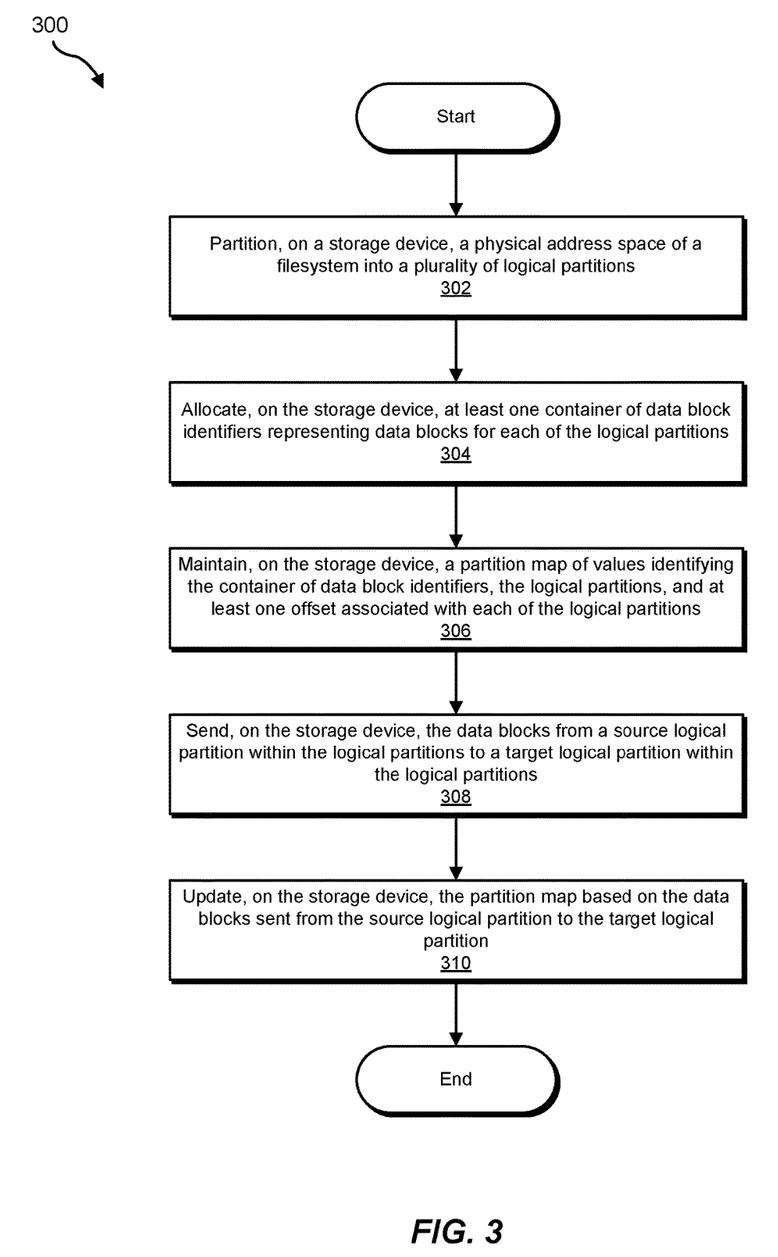
FIG. 3 is a flow diagram of an example method for efficiently moving data within a filesystem.

FIG. 3 is a flow diagram of an example computer-implemented method 300 for efficiently moving data within a filesystem. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may partition, on a storage device, a physical address space of a filesystem into smaller logical partitions. As an example, the filesystem, which may collectively include server 206 and computing device 202 in FIG. 2, may include physical address space on each of the aforementioned devices for storing data associated with multiple files. In this example, partitioning module 104 may, as part of server 206, partition a physical address space of a filesystem into logical partitions including source logical partition 126 (which may be located on server 206) and target logical partition 226 (which may be located on computing device 202).

In some examples, the filesystem may only include a single computing device (e.g., only server 206 or computing device 202) and partitioning module 104 may partition the physical address space into source and target logical partitions on the same device (e.g., the source and target logical partitions 126 and 226 may be created on either server 206 or computing device 202). As another example, the filesystem may include both server 206 and computing device 202 and partitioning module 104 may partition the physical address space into source and target logical partitions on a single device (e.g., source and target logical partitions 126 and 226 may be created either on server 206 or computing device 202).

At step 304 in FIG. 3, one or more of the systems described herein may allocate one or more containers of data block identifiers representing data blocks for each of the logical partitions created at step 302. For example, allocation module 106 may, as part of server 206, allocate data block containers, including data block identifiers for data blocks 124 in FIG. 2, for source logical partition 126 and target logical partition 226. In some examples, the data block identifiers may include a set of contiguous logical block numbers representing data blocks 124 in a data block container.

Figure 4:
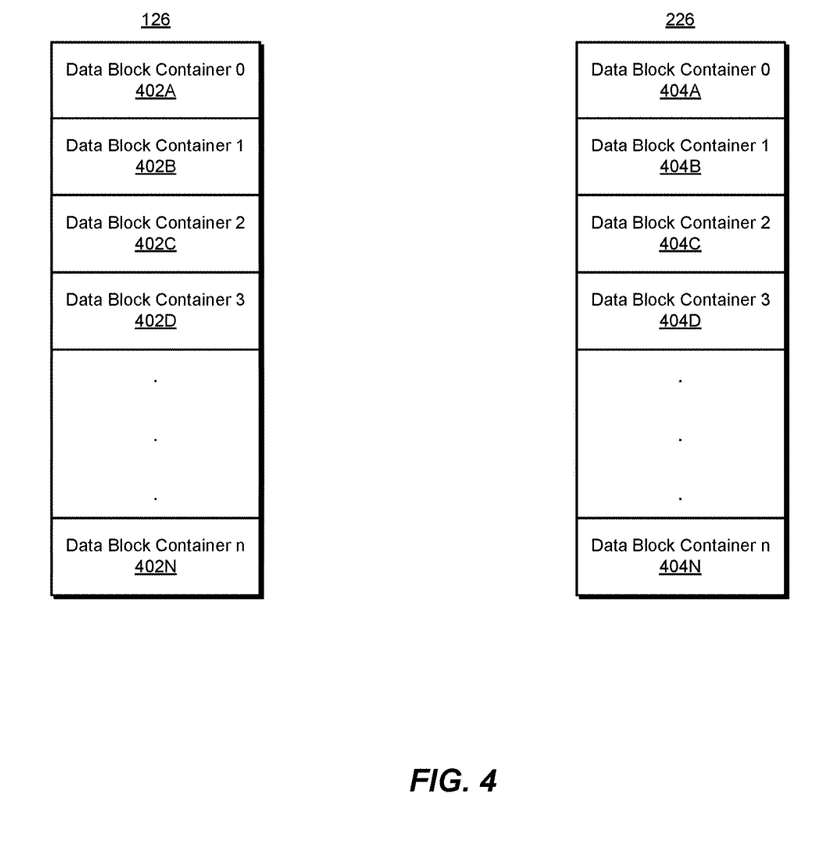
FIG. 4 is a block diagram of source and target logical partitions for efficiently moving data within a filesystem.

FIG. 4 illustrates example data block containers for source logical partition 126 and target logical partition 226. In this example, source logical partition 126 may include data block containers 402A, 402B, 402C, 402D, and 402N while target logical partition 226 may include data block containers 404A, 404B, 404C, 404D, and 404N. In some examples, data block containers 402A-402N may collectively correspond to a virtual device in source logical partition 126. Similarly, data block containers 404A-404N may collectively correspond to a virtual device in target logical partition 226. In some examples, a logical partition (e.g., source logical partition 126 and/or target logical partition 226) may include multiple virtual devices.

In one example, data block containers 402A-402N and 404A-404N may each include a Partition Allocation Unit (PAU) which is a large set of contiguous logical block numbers. In some examples, the size of a PAU may be selected such that it covers a range of several million data blocks. Thus, for example, a PAU having a size of 8 GB may cover 8 million data blocks on a filesystem where each data block has a size of 1 KB.

Returning now to FIG. 3, at step 306, one or more of the systems described herein may maintain a partition map of values identifying one or more containers of data block identifiers, logical partitions, and an offset associated with the logical partitions. For example, maintaining module 108 may, as part of server 206, maintain numerical values identifying data block containers 402A-402N and 404A-404N in FIG. 4, source and target logical partitions 126 and 226, an offset for source logical partition 126 and an offset for target logical partition 226.

The term "offset," as used herein, generally refers to a numerical value used as a lookup for the location of a physical PAU that corresponds to a logical PAU in a logical partition in a filesystem. For example, each of the contiguous logical block numbers comprising PAUs in data block containers 402A-402N in source logical partition 126 has a corresponding physical block number identifying data blocks stored on server 206.

At step 308 in FIG. 3, one or more of the systems described herein may send data blocks from a source logical partition to a target logical partition. For example, sending module 110 may, as part of server 206, send data blocks 124 from source logical partition 126 to target logical partition 226. In some examples, sending module 110 may send data blocks 124 from source logical partition 126 to target logical partition 226 during a bulk copy of data blocks 124 between server 206 and computing device 202.

Additionally, or alternatively, sending module 110 may send data blocks 124 from source logical partition 126 to target logical partition 226 during a device shrink operation associated with server 206 and/or computing device 202. Additionally, or alternatively, sending module 110 may send data blocks 124 from source logical partition 126 to target logical partition 226 during a defragmentation operation associated with server 206 and/or computing device 202.

At step 310 in FIG. 3, one or more of the systems described herein may update a partition map based on the data blocks sent from the source logical partition to the target logical partition at step 308. For example, updating module 112 may, as part of server 206, update the partition map of values maintained at step 306. In this example, the updating of the partition map may include updating a table of values identifying data block containers 402A-402N, data block containers 404A-404N, source logical partition 126, target logical partition 226, an offset associated with source logical partition 126, and an offset associated with target logical partition 226.

Figure 5:
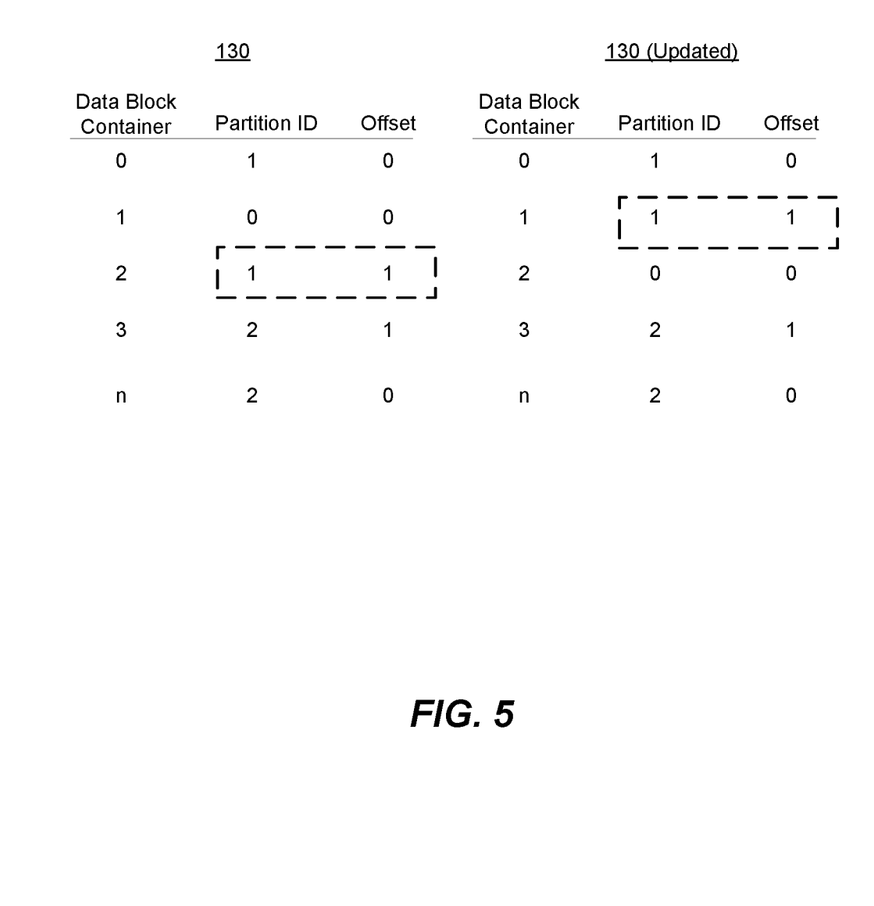
FIG. 5 is a block diagram of a partition map for efficiently moving data within a filesystem.

FIG. 5 illustrates an example partition map 130 before and after being updated by updating module 112. In this example, partition map 130 includes a table of values (e.g., metadata) for a data block containers (e.g., corresponding to data block containers 402A-402N in source logical partition 126), a partition ID (e.g., corresponding to logical partitions including source logical partition 126), and an offset associated with source logical partition 126. As shown by the dashed lines surrounding the partition ID and offset values for data block container 2 in FIG. 5, a copy operation has occurred resulting in data blocks being moved from data block container 2 (e.g., in source logical partition 126) to data block container 1 (e.g., in target logical partition 226). As shown by the dashed lines surrounding the values in updated partition map 130, the partition ID and offset values for data block container 1 have been updated with the values from data block container 2.

As explained above in connection with method 300 in FIG. 3, the systems and methods described herein may provide efficient data movement with minimal metadata overhead. A physical address space of a storage device may be divided into logical partitions. The logical partitions may be allocated space as Partition Allocation Units (PAUs). PAUs may include fixed size large sets of contiguous data blocks (e.g., on the order of several GBs) on a storage device. A partition map may be maintained to track a mapping between logical partitions and PAUs. The partition map may further include an inode block map that contains a mapping of logical to virtual block numbers. When a device copy operation (e.g., a device shrink) is performed, the PAUs are bulk copied at the appropriate location and the only updates made to metadata is the PAU number. Thus, the inode block map does not need to be changed and only the PAU reference in the partition map is updated. As a result, of the reduced metadata overhead, the movement of data in a filesystem is made more efficient even when there are large number of files and the speed at which file data is copied is increased.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for efficiently moving data within a filesystem, at least a portion of the method being performed by a computing device comprising at least one processor, the method comprising:

partitioning, on a storage device, a physical address space of a filesystem into a plurality of logical partitions;

allocating, on the storage device, at least one container of data block identifiers representing data blocks for each of the logical partitions;

maintaining, on the storage device, a partition map of values identifying the container of data block identifiers, the logical partitions, and at least one offset associated with each of the logical partitions;

sending, on the storage device, the data blocks from a source logical partition within the logical partitions to a target logical partition within the logical partitions; and updating, on the storage device, the partition map based on the data blocks sent from the source logical partition to the target logical partition.

2. The method of claim 1, wherein the container of data block identifiers corresponds to a virtual device created in each of the logical partitions.

3. The method of claim 1, wherein the container of data block identifiers comprises a set of contiguous logical block numbers.

4. The method of claim 1, wherein sending, on the storage device, the data blocks from the source logical partition to the target logical partition comprises performing a bulk copy operation of the data blocks from the source logical partition to the target logical partition.

5. The method of claim 1, wherein the data blocks are sent from the source logical partition to the target logical partition during a shrink operation associated with the storage device.

6. The method of claim 1, wherein the data blocks are sent from the source logical partition to the target logical partition during a storage device defragmentation operation.

7. The method of claim 1, wherein updating, on the storage device, the partition map based on the data blocks sent from the source logical partition to the target logical partition comprises updating the values identifying the container of data block identifiers, the logical partitions, and the offset associated with each of the logical partitions.

8. A system for efficiently moving data within a filesystem, the system comprising:
- a partitioning module, stored in memory, that partitions, on a storage device, a physical address space of a filesystem into a plurality of logical partitions;
- an allocation module, stored in memory, that allocates, on the storage device, at least one container of data block identifiers representing data blocks for each of the logical partitions;
- a maintaining module, stored in memory that maintains, on the storage device, a partition map of values identifying the container of data block identifiers, the logical partitions, and at least one offset associated with each of the logical partitions;
- a sending module, stored in memory, on the storage device, that sends the data blocks from a source logical partition within the logical partitions to a target logical partition within the logical partitions;
- an updating module, stored in memory, on the storage device, that updates the partition map based on the data blocks sent from the source logical partition to the target logical partition; and
- at least one physical processor that executes the partitioning module, the allocating module, the maintaining module, the sending module, and the updating module.

9. The system of claim 8, wherein the container of data block identifiers corresponds to a virtual device created in each of the logical partitions.

10. The system of claim 8, wherein the container of data block identifiers comprises a set of contiguous logical block numbers.

11. The system of claim 8, wherein the sending module sends the data blocks from the source logical partition to the target logical partition by performing a bulk copy operation of the data blocks from the source logical partition to the target logical partition.

12. The system of claim 8, wherein the data blocks are sent from the source logical partition to the target logical partition during a shrink operation associated with the storage device.

13. The system of claim 8, wherein the data blocks are sent from the source logical partition to the target logical partition during a storage device defragmentation operation.

14. The system of claim 8, wherein the updating module updates the partition map based on the data blocks sent from the source logical partition to the target logical partition by updating the values identifying the container of data block identifiers, the logical partitions, and the offset associated with each of the logical partitions.

15. A non-transitory computer-readable medium comprising one or more computer-executable instructions that, when executed by at least one processor of a computing device, cause the computing device to:
- partition, on a storage device, a physical address space of a filesystem into a plurality of logical partitions;
- allocate, on the storage device, at least one container of data block identifiers representing data blocks for each of the logical partitions;
- maintain, on the storage device, a partition map of values identifying the container of data block identifiers, the logical partitions, and at least one offset associated with each of the logical partitions;
- send, on the storage device, the data blocks from a source logical partition within the logical partitions to a target logical partition within the logical partitions; and
- update, on the storage device, the partition map based on the data blocks sent from the source logical partition to the target logical partition.

16. The non-transitory computer-readable medium of claim 15, wherein the at least one container of data block identifiers comprises a set of contiguous logical block numbers.

17. The non-transitory computer-readable medium of claim 15, wherein the data blocks from the source logical partition to the target logical partition are sent by performing a bulk copy operation of the data blocks from the source logical partition to the target logical partition.

18. The non-transitory computer-readable medium of claim 15, wherein the data blocks are sent from the source logical partition to the target logical partition during a shrink operation associated with the storage device.

19. The non-transitory computer-readable medium of claim 15, wherein the data blocks are sent from the source logical partition to the target logical partition during a storage device defragmentation operation.

20. The non-transitory computer-readable medium of claim 15, wherein the partition map is updated based on the data blocks sent from the source logical partition to the target logical partition by updating the values identifying the container of data block identifiers, the logical partitions, and the offset associated with each of the logical partitions.

* * * * *